Patented Nov. 10, 1936

2,060,715

UNITED STATES PATENT OFFICE 2,060,715

SYNTHETIC RESINS

James A. Arvin, Wilmington, Del., assignor to E. I. du Pont de Nemours & Company, Wilmington, Del., a corporation of Delaware No Drawing. Application January 13, 1933, Serial No. 651,634

38 Claims. (Cl. 260—2)

This invention relates to new synthetic resins of an ether type, more particularly to a new type of resin obtainable from polyhydric phenols and aliphatic polyhalides.

These new resins are characterized, probably because of their ether linkages, by their remarkable inertness to both chemical and physical influences such as heat, light, water, acids and alkalies. Another unusual feature of certain of the new resins, due probably to a linear type of condensation, is their resemblance in certain respects to cellulose ethers and esters, including those commercially used in the coating and plastic arts. Unlike most of the known synthetic resins, the new resins do not, except in special instances, harden by the action of heat or oxygen of the atmosphere or other external influences. Films dry simply by evaporation of solvent, and the hardness of the resins is controlled almost entirely by the selection of the ingredients, the extent of the condensation, and other preparative conditions.

This invention then has as an object new synthetic resins and the methods for their preparation. A further object is resins containing recurring ether linkages, and physically resembling cellulose derivatives in several respects. A still further object is resins which do not heat harden or oxidize and which are very inert to other physical and chemical influences. Other objects will appear hereinafter.

These objects are accomplished by condensing the alkali or alkaline earth metal salts of polyhydric phenols with polyhalides whose halogen atoms are attached to aliphatic carbon atoms. The polyhydric phenols and polyhalides are subject to certain qualifications explained hereinafter.

Some suitable phenols for this reaction are resorcinol, di(4 - hydroxyphenyl) dimethylmethane, p,p'-dihydroxydiphenyl, and 1,1-di(4-hydroxyphenyl)-cyclohexane. A few examples of suitable polyhalides are xylylene dibromide, $\beta\beta'$-dichlorodiethyl ether, and amylene dichloride.

It should be understood that this invention is not concerned with the phenol-aldehyde resin-forming reaction, and has no relation to the extensive art dealing with the formation of such resins, or with their after-treatment. Although the new synthetic resins which are the subject of this invention are prepared from a particular type of phenol (such as phenolic materials having two phenolic hydroxyl groups), the new resin-forming reaction is one of etherification, and the new resins are ether resins, not phenol-aldehyde or modified phenol-aldehyde resins. In the prior art, processes are described in which phenols are combined with aldehydes in the presence of halogen compounds; such processes have no relation to the present invention, in which aldehydes are not employed as resin-forming ingredients. Methods are also known in the resin art for treating partially or completely condensed phenol-aldehyde resins with various organic halogen compounds; such processes yield modified phenol-aldehyde resins and not ether resins. The physical and chemical properties of the ether resins which unquestionably distinguish them from phenol-aldehyde resins will be evident as the description proceeds.

In the preferred embodiment of this invention, the polyhydric phenol is mixed with an aqueous solution of the theoretical or a slightly excess quantity of alkali and heated at a relatively high temperature, above 70° C. and preferably above 100° C., but below the decomposition temperatures of the ingredients, with an equivalent amount of the polyhalide. The apparatus preferably consists of a vessel fitted with a thermometer, reflux condenser, and a stirrer designed to sweep the sides and bottom of the vessel. Heating is continued until the desired state of condensation is obtained or until as much of the phenol and halide are reacted as possible. Tests can be made for uncombined halide by distilling a few drops from the reaction vessel (when the halide is volatile). If this distillate is cloudy, some of the halide is uncombined and refluxing is continued. When the distillate is clear, the water can be distilled off without loss of halide; this will then permit the use of higher temperatures in the later stages of the reaction with a resultant decrease in time of preparation. Further heating after the distillate becomes clear is generally necessary, inasmuch as this "clear" point only shows that essentially all the halide has been combined by the elimination of at least one of its halogen atoms, but not necessarily all of them. The final reaction mass is very viscous, also opaque because of occluded salt. The hot mass is poured into a steam-jacketed Werner-Pfleiderer type mixer and washed with small portions of dilute hydrochloric acid and finally with water to remove the salt. The resin is then dried, either in vacuo or at atmospheric pressure, for several hours at temperatures above its melting point, e. g., in the range 100–150° C. Clear tough resins are obtained whose hardness will depend largely on the temperature, time of reaction, and certain other details (see Example II).

The condensation can also be carried to completion without distilling off the water, but more time is required. In either case, when the reaction is complete, the mass comprising resin and salt, with or without water, instead of being washed directly in the mixer, can be diluted with a solvent for the resin, such as xylene, and acidified with dilute acid. The aqueous salt solution is then separated mechanically, and the resin solution washed with water and finally dried by distilling off a small quantity of solvent. The dry solution is then filtered from any remaining salt and other insoluble material. If the solid resin is desired, the solvent can be removed by distillation.

While the above method of carrying out the preparation of the new resins in an aqueous medium represents the preferred embodiment of the invention, the use of other methods is not precluded. For example, a part of the condensation may be carried out in the presence of an inert solvent such as toluene or chlorobenzene; in such cases, the solvent is preferably added when there is no longer any free halide present, as shown by a clear distillate. Likewise, a part or all of the condensation may be carried out using as a medium alcohols such as butyl alcohol, glycerol, or glycol, with or without water; or the entire reaction can be carried out in an anhydrous medium such as xylene or chlorobenzene by first finely dispersing the alkali and polyhydric phenol in the solvent (as by grinding in a ball mill), adding the polyhalide thereto, and heating to resinification. In some cases, the polyhalide also can be reacted with the phenol directly (i. e., without going through the sodium salt) in aqueous or anhydrous media, although this method is generally more difficult and complicated, even when catalyzed by an HCl acceptor, such as pyridine. Generally speaking, all known methods for making ethers are applicable in principle to the preparation of the ether resins, and the use of such methods is considered to be included in this invention.

It has been indicated that chemically equivalent proportions of the polyhydric phenol and the polyhalide are preferred. By this is meant that two mols. of a trihydric phenol will require three mols. of a dihalide; two mols. of a trihalide will require three mols. of a dihydric phenol; one mol. of a dihydric phenol will require one mol. of a dihalide, etc. In other words, the phenolic hydroxyls and aliphatic halogens should be present in the same number. Variations from chemically equivalent amounts are not precluded, however, but the greater the variation (i. e., excess polyhalide or excess polyhydric phenol) the less desirable will be the resins, and if a too highly unbalanced ratio is reached, a high molecular weight polymer can no longer be obtained. This limiting ratio is definite and is the same as that for all resins obtained by reacting two polyfunctional compounds. In the present invention, in order to have resin-forming or polymerizing proportions of polyhydric phenol and polyhalide, their molal ratios must be so chosen that the total number of halogen atoms or phenolic hydroxyls (number of mols. of phenol or halide multiplied by its valency) is not equal to or greater than twice the number of the other; in other words, for polymerizing proportions, the ratio of halogen atoms to phenolic hydroxyls or phenolic hydroxyls to halogen atoms should be greater than 1:2 and less than 2:1. The limiting molal ratios of polyhydric phenol and polyhalide will vary with the valency of the phenol and halide, but knowing their valencies, it is possible to calculate readily for any given number of mols. of phenol or halide the maximum and minimum number of mols. of the other which can be used. In the simplest case, dihydric phenol and dihalide, the molal ratio of one to the other should be greater than 1:2 and less than 2:1. These same limiting molal ratios hold in all instances where the valencies of the phenol and halide are the same. In more complicated cases, for example dihalide and trihydric phenol, the molal ratio of halide to phenol should be greater than 3:4 and less than 3:1; or conversely the molal ratio of phenol to halide should be greater than 1:3 and less than 4:3.

The following examples, in which the parts are by weight, are intended to make clear specific details of the invention; and are not to be construed as limiting the scope thereof. Examples I—VIII inclusive illustrate the combination of various polyhydric phenols with the same polyhalide, $\beta,\beta'$-dichlorodiethyl ether; Examples IX and X illustrate different polyhalides with the same polyhydric phenol, di(4-hydroxyphenyl)-dimethylmethane. Example VIII also illustrates the inclusion of a monohydric phenol as a resin ingredient; Example IX also illustrates the use of pressure; Example II also illustrates a method for controlling the hardness of the resin and the use of a mixture of two pure and separately prepared polyhydric phenols; and Example X also illustrates the use of a commercially available polyhalide mixture.

Of all the materials tested, di(4-dihydroxyphenyl)dimethylmethane appears to be the best polyhydric phenol and $\beta,\beta'$-dichlorodiethyl ether the best polyhalide, for the purposes of this invention.

In Example I is shown as the simplest type of polyhydric phenol, a mononuclear dihydric phenol which carries no other ring substituents. This type has been found to form very good ether resins with aliphatic polyhalides:

*Example I*

| | Parts |
|---|---|
| Sodium hydroxide (50%) | 328 |
| Water | 380 |
| Resorcinol | 220 |
| Dichlorodiethyl ether | 286 |

All the above ingredients are refluxed and stirred for 48 hours. A dark red rubbery mass and a dark aqueous solution are formed. The aqueous solution is discarded and the resinous mass washed with small portions of dilute hydrochloric acid in the Werner-Pfleiderer mixer until the washings are acid to Congo red (about 30 parts by weight of 37.5% HCl will be required, showing a conversion of 90-95%). The resin is then washed with several portions of chloride-free water, or until the washings give only a faint cloud with silver nitrate. The product is finally dried in vacuo for 40 hours at 110-125° C. A clear, hard, tough, reddish-brown, non-heat-hardening resin is obtained which is soluble in ethylene dicholride and insoluble in alcohol.

Substituted resorcinols may replace the resorcinol of the above example. Among these may be mentioned orcin (1-methyl-3,5-dihydroxybenzene), m-xylorcin (1,3-dimethyl-4,6-dihydroxy benzene), ditertiaryamylresorcinol, hexylresorcinol and cyclohexylresorcinol. The other dihydroxybenzenes, pyrocatechol and hydroquinone, are also suitable, as well as their derivatives such as hydrocumoquinone (1,2,4-trimethyl-3,6-dihydroxybenzene); 2,5-dichloroquinone; and isopropylpyrocatechol. As an example of a mononuclear heterocyclic dihydric phenol, α,α'-dihydroxypyridine may be given.

Proceeding to the more complex types of dihydric phenols, an ether resin can be synthesized from polynuclear phenols. Suitable polynuclear phenols are of two types, those of the diphenyl type, such as p,p'-dihydroxydiphenyl, and those of the naphthalene type, such as 2,6-dihydroxynaphthalene and anthrahydroquinone. Frequently these high melting phenols are advantageously combined under pressure, inasmuch as the refluxing temperature at atmospheric pressure is not sufficiently high to cause the proper condensation. This can possibly be ascribed to the poorer solubility characteristics of the alkali salts of such phenols and/or to their high melting points. For reasons of solubility, it is also generally better to use strong alkalies such as sodium and potassium hydroxides rather than the alkaline earth hydroxides such as those of calcium and barium. In addition, the potassium salts of the phenols sometimes are more satisfactory than the sodium salts, but are not as economical.

A still more complex type of suitable dihydric polynuclear phenol is that type in which the nuclei are separated by other atoms or groups. Among these are the various dihydroxy-benzophenones where the hydroxyl groups are on the same or different rings, such as p,p'-dihydroxybenzophenone. Still another example is di(4-hydroxyphenyl) sulfone. The latter compound, however, when used alone to make an ether resin, forms a very hard, high melting and difficultly soluble product. For this reason, it is desirable to employ some other polyhydric phenol in conjunction with the sulfone in order to impart a greater solubility. A phenol which can be used for this purpose is di(4-hydroxyphenyl)dimethylmethane. This phenol, in addition, is of especial interest for another reason as will be shown below. Conversely, the sulfones can be used to increase the melting and softening points of other ether resins. An example of the preparation of an ether resin from a mixture of di(4-hydroxyphenyl) sulfone and di(4-hydroxyphenyl) dimethylmethane is as follows:

*Example II*

| | Parts |
|---|---|
| (A) Di(4-hydroxyphenyl)dimethylmethane (M. P. 157° C.) | 313.5 |
| (B) Di(4-hydroxyphenyl) sulfone (M. P. 243° C.) | 86.0 |
| (C) Dichlorodiethyl ether | 246.0 |
| (D) Sodium hydroxide (49%) | 286.0 |
| (E) Water | 300.0 |

Ninety per cent of ingredient (D), and all of ingredients (E), (A), and (B) are placed, in the order named, in the reaction vessel, and heated to refluxing temperature with stirring. Ingredient (C) is then added slowly and refluxing continued for 40 hours. The remainder of ingredient (D) is added and the water is distilled off over a period of 1½ hours, the temperature meanwhile rising to 235° C. The temperature is maintained at this point for 10½ hours with stirring. A non-oxidizing atmosphere may be produced by the cautious addition of a small amount of water during the latter period. The resin is cooled, broken into small pieces, and digested with ethylene dichloride. The solution thus obtained is washed with dilute hydrochloric acid until the washings are acid to Congo red, then with water. The resin solution can be dried by distilling a small amount of the solvent, and the dry solution can be filtered to remove insoluble matter. If the solid resin is desired, the solvent can be removed by distillation. The final resin has no tendency to heat harden, i. e., polymerize on heating to an infusible, insoluble product. The above method of purifying the resin as carried out in a solvent for the resin is especially advantageous for those resins which have too high a softening point for working in the mixer. The above method of reserving a portion of the alkali for addition at a later stage is advantageous in raising the melting point of the final resin; in such cases it is sometimes desirable also to add an inert solvent at the time the remaining alkali is added (i. e., carry out a portion of the resinification in a solvent).

Instead of the di(4-hydroxyphenyl) sulfone of Example II, its various ring-substituted derivatives such as di(4-hydroxy-3-methylphenyl) sulfone, di(4-hydroxy-3,5-dimethylphenyl) sulfone, di(4-hydroxy-3-methyl-5-chlorophenyl) sulfone, di(4-hydroxy-3-chlorophenyl) sulfone and di(4-hydroxy-3,5-dichlorophenyl) sulfone may be used. There is no indication that the nuclear chlorine atoms enter into the condensation, and the ether resins obtained from the sulfones carrying chlorine atoms show somewhat better solubility characteristics than those made with an equal amount of unsubstituted sulfone.

In addition to the —CO— and —SO₂— groups, the polynuclear dihydric phenol may be characterized by still other atoms or groups between the nuclei such as —S—, —CH₂—, —S—S—, —O—, —CO—CO—, —CH₂—CH₂—, and the like. Many of these phenols, in addition to being difficult to combine because of high melting points and low solubilities of the alkali salts, give rather dark colored resins, which are undesirable for many purposes. The most generally desirable types of the polynuclear phenols are those in which the para positions to the phenolic hydroxyls are occupied by a secondary, or preferably tertiary, non-benzenoid carbon atom. The ether resins obtained from such phenols are very pale-colored and at the same time possess all the other desirable characteristics of the ether resins in general, e. g., their great inertness to physical and chemical influences. As examples of such phenols there may be mentioned the following:

Di(4-hydroxyphenyl)methylmethane
Di(4-hydroxyphenyl)dimethylmethane
Di(4-hydroxyphenyl)methylethylmethane
Di(4-hydroxyphenyl)propylmethane
Di(4-hydroxyphenyl)dipropylmethane
Di(4-hydroxyphenyl)phenylmethane The above are examples of substantially unpolymerizable dihydric polynuclear phenols of the general formula

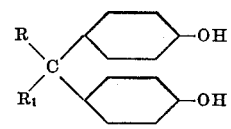

in which R is hydrogen, alkyl, or aryl and R₁ is alkyl or aryl.

For best results, it is necessary that all free phenol, which is normally associated with crude samples of the above compounds, be removed before making the ether resins. This can be done by steam distilling or washing several times with hot water, and recrystallizing from toluene or acetic acid to a constant melting point. This eliminates unchanged phenol and undesirable isomers. The presence of unchanged phenol, or of a condensation product of phenol not containing the p-tertiary carbon atom, gives ether resins which are softer, darker, and comparatively sensitive to light (i. e., discolor). The making of an ether resin from one of the above compounds can be illustrated as follows:

Example III

| | Parts |
|---|---|
| Di(4-hydroxyphenyl)dimethylmethane (M. P. 157° C.) | 456 |
| Dichlorodiethyl ether | 286 |
| Water | 450 |
| Sodium hydroxide (50%) | 326 |

The above mixture is refluxed in an atmosphere of nitrogen for 10–15 hours with stirring or until a few drops of clear distillate show that there is no remaining free halide. The water is distilled off over a period of two hours, the temperature finally being carried to 225–230° C. and maintained at this point for 12 hours. The mass is now very viscous and pasty. It is poured while hot into a steam-jacketed Werner-Pfleiderer mixer, washed three times with water, then with small portions of dilute hydrochloric acid until the washings are acid to Congo red and finally with water again until the washings are substantially free of chloride ion. The product is then dried by heating in vacuo at 120–125° C. for 16 hours. The resin is hard, clear, pale-colored and extremity tough, and is inert to acid, alkali, water and light. It is insoluble in alcohol and aliphatic hydrocarbons, but soluble in toluol, xylol and aromatic esters such as dibutyl phthalate. Films dry to a hard, non-tacky condition in a very few minutes by simple evaporation of solvent; in this respect, the resin resembles cellulose derivatives. The resin does not mix readily with oils and most cellulose derivatives, but is compatible with benzyl cellulose. The resin does not heat-harden (like a phenol-formaldehyde resin) nor dry by oxidation (like a drying oil modified polyhydric alcohol-polybasic acid resin).

The solvent method for the purification of the resin of Example III is illustrated as follows:

Example IV

| | Parts |
|---|---|
| Di(4-hydroxyphenyl)dimethylmethane (M. P. 157° C.) | 343 |
| Dichlorodiethyl ether | 216 |
| Sodium hydroxide (50%) | 246 |
| Water | 480 |

The above mixture is refluxed and stirred for 30 hours in an atmosphere of nitrogen. The water is distilled off and the residue heated for 3 hours at 200° C. A large volume of toluene and water is then added and the thick, milky liquid acidified to Congo red with hydrochloric acid. The mixture is heated and stirred until the resin dissolves and is then filtered. The water layer is discarded and the toluene solution washed by stirring with fresh portions of water. A small amount of the toluene is distilled to remove the last traces of water. The toluol solution can be used as such, or, if the solid resin is desired, the toluene can be removed by distillation, the last traces preferably in vacuo.

As in the case of the sulfones, ring-substituted derivatives of these dihydric phenols (i. e., dihydric polynuclear phenols having a tertiary carbon between the nuclei) are very desirable for making ether resins. Some examples of these are:

(1) Di(4-hydroxy-3-chlorophenyl)dimethylmethane (2) Di(4-hydroxy-3-methylphenyl)dimethylmethane (3) Di(4-hydroxy-3-methyl-5-chlorophenyl)-dimethylmethane (4) Di(4-hydroxy-3,5-dimethphenyl)dimethylmethane (5) Di(4-hydroxy-3,5-dichlorophenyl)dimethylmethane The above are examples of substantially unpolymerizable dihydric polynuclear phenols of the general formula previously given in which the benzene rings have halogen and alkyl substituents. It is desirable for best results to purify carefully the above dihydric phenols, e. g., by washing and crystallization, before making the ether resins. The chlorine-substituted derivatives in the above table can conveniently be obtained by direct chlorination; for example, (5) can be obtained by chlorinating di(4-hydroxyphenyl)dimethylmethane in glacial acetic acid solution. Such methods of preparation usually give purest products. The preparation of an ether resin from one of the above ring-substituted phenols can be illustrated as follows:

Example V

| | Parts |
|---|---|
| Di(4-hydroxy-3-methylphenyl)dimethylmethane | 448 |
| Dichlorodiethyl ether | 250 |
| Sodium hydroxide (50%) | 286 |
| Water | 415 |

The above mixture is refluxed and stirred for 10 hours, or until a few drops of distillate are clear. The reflux condenser is then replaced by a downward condenser and the water distilled off over a period of 2 hours, the temperature meanwhile being carried to 225–230° C. By maintaining in this range for 12 hours, a viscous, opaque mass is obtained. It is poured while hot into a steam jacketed Werner-Pfleiderer mixer, washed 2–3 times with water, then with small portions of dilute hydrochloric acid until the washings are acid to Congo red, and finally with more water until the water washings are substantially free of chloride ion. The product is then dried by heating at 130° C. in vacuo for 16 hours. A pale, tough resin is obtained which is soluble in toluol and insoluble in alcohol. Films dry very rapidly. The resin does not heat-harden (like a phenol-formaldehyde resin) nor oxidize (like a drying oil or a drying oil acid modified polyhydric alcohol-polybasic acid resin); drying of this and other ether resins resembles that of cellulose derivatives, taking place simply by solvent evaporation However, the ether resins show improvements over cellulose derivatives in a number of respects. The latter have very poor durability and are often inflammable (nitrocellulose); the ether resins are very tough, form extremely tenacious films, are inert to acid, alkali, gasoline, alcohol and atmospheric conditions.

The preparation of an ether resin from still another of the ring-substituted polyhydric phenols of the type illustrated in Example V can be illustrated as follows:

*Example VI*

| | Parts |
|---|---|
| Di(4-hydroxy-3,5-dichlorophenyl)dimethylmethane (also called tetrachlorodiphenylolpropane) | 488 |
| Dichlorodiethyl ether | 191 |
| Sodium hydroxide (50%) | 213 |
| Water | 325 |

The above mixture is refluxed for 11 hours, the reflux condenser replaced by a downward condenser and the water distilled off. The first few drops will be clear, showing that practically all the dichlorodiethyl ether has been combined through the elimination of at least one of its chlorine atoms (but not necessarily both of them). After two hours of distillation the temperature of the reaction mass can be raised to 220-230° C. It is then held in this range for 10 hours. The viscous mass is poured while hot into a heated Werner-Pfleiderer mixer, washed 2-3 times with hot water, then with dilute hydrochloric acid until the washings are acid to Congo red, and finally with water until the water washings are substantially free of chloride ion. The product is dried in vacuo at 120-125° C. for 24 hours. An unusually hard, tough resin is obtained which is insoluble in alcohol and gasoline, but soluble in xylene, ethylene dichloride, and dibutyl phthalate, and to a considerable extent in raw China-wood oil. Since the corresponding resin made from di(4-hydroxyphenyl)dimethylmethane is insoluble for the most part in drying oils (see Example III), this increase in oil-solubility may be ascribed to the nuclear chlorine atoms which are retained in the resin.

The preparation of an ether resin from still another type of dihydric phenol can be illustrated. This type of phenol is obtained by condensing acids or anhydrides such as succinic acid, phthalic anhydride, etc., with phenol, chlorophenol, resorcinol, thymol, and the like. The phenols obtained are called succineins, phenolphthalein, fluorescein, thymolphthalein, etc. Their halogenated derivatives such as dichlorophenolphthalein, eosin, erythrosine and the like are also suitable. An ether resin can be made from phenolphthalein, for example, as follows:

*Example VII*

| | Parts |
|---|---|
| Phenolphthalein | 159 |
| Dichlorodiethyl ether | 72 |
| Sodium hydroxide (50%) | 84 |
| Water | 225 |

The above mixture is stirred and refluxed for 24 hours. The water is poured off and the mass acidified while hot with 5% hydrochloric acid. A large volume of ethylene dichloride is added and the mixture heated and stirred until the solid portion dissolves. The water layer is separated and discarded and the dichloride solution boiled to remove residual moisture and then filtered to remove salt and other insoluble material. If the solid resin is desired, the ethylene dichloride can be removed by distillation.

One other type of suitable dihydric phenol may be mentioned, viz., that which is a combination of the naphthalene and diphenyl types, as illustrated by the compound 2-phenyl-1,3-dihydroxynaphthalene.

So far as is known, all phenolic materials that have two or more phenolic hydroxyls are suitable for the ether resin reaction except those phenolic bodies (e. g., certain polyhydric phenols having methylol groups) which on heat treatment are converted readily to infusible, insoluble products. It is obvious that such a transformation into an insoluble, infusible material by some other resin-forming reaction interferes with the formation of ether polymers which are the subject of this invention. If the temperatures and reaction conditions for etherification are such that this transformation to the insoluble and infusible state takes place, it does so at the expense of the etherification reaction. The term "polyhydric phenol" is therefore used in the present specification and claims to mean a phenolic body having at least two phenolic hydroxyls, which phenolic body is substantially unpolymerizable in that it is not readily converted on heat treatment to an infusible or insoluble product, these phenols, as shown by the examples thereof given herein, being monomeric or simple phenols.

Although the dihydric phenols are the most suitable for making the ether resins, trihydric and higher phenols can also be used. Pyrogallol and phloroglucinol may be given as examples of trihydric mononuclear phenols, and the trihydroxynaphthalenes as examples of trihydric polynuclear phenols. Suitable tetrahydric phenols are the tetrahydroxybenzenes, biresorcin, the tetrahydroxydiphenyls, and the hydroxyxanthones (obtainable from salicylic acid and resorcinol). Such phenols have little commercial importance at present, and, although suitable for making ether resins under the proper conditions, are difficult to react because of their high melting points, the limited solubilities of their alkali salts, and the fact that the resins have a tendency to be insoluble before all of the phenol is combined. The latter is probably due to the fact that there are so many available phenolic hydroxyl groups. This tendency to insolubility can be offset to a certain extent by including dimethyl sulfate, monohydric phenols and/or aliphatic monohalides as reaction components. The net result is often a softer or more brittle resin which is frequently less inert chemically and less resistant to moisture than the corresponding resin where no "blocking" component is used. Even with the dihydric phenols it is often desirable to include these monofunctional or "blocking" ingredients, and in such cases a soft balsamic-type resin is obtained. Obviously, however, this substitution (in chemically equivalent amounts) of a monofunctional component for a part of the corresponding polyfunctional component (i. e., a monohydric phenol for a part of the polyhydric phenol and a monohalide for a part of the polyhalide) can be carried too far, or to such an extent that the formation of a resin by the ether reaction is completely blocked. This principle can be more readily appreciated by the following relationships, which represent the dividing lines:

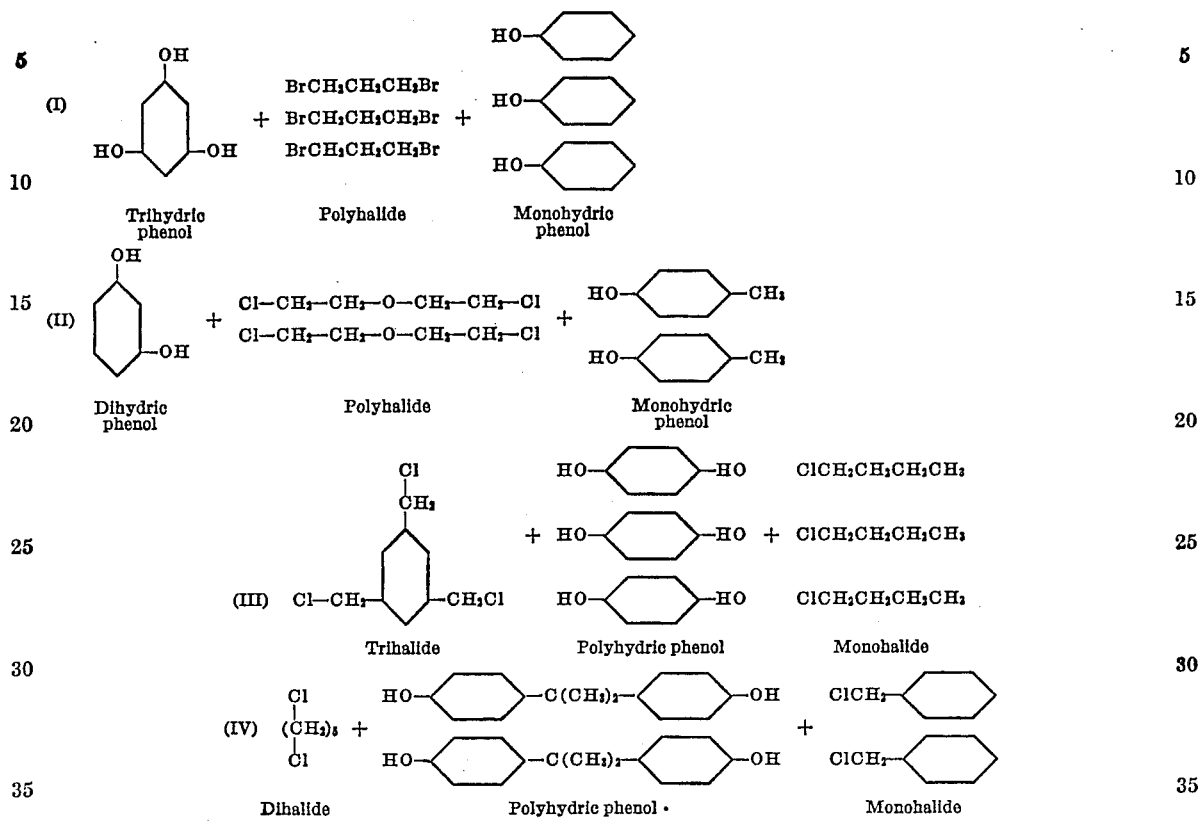

In cases (I) and (II) the molal ratio of monohydric phenol to dihalide is 1:1; where this ratio is 1:1 or greater, highly polymeric materials cannot be obtained by the ether reaction. Another way of expressing this limiting proportion of monohydric phenol is that the ratio of mols of monohydric phenol to phenolic hydroxyls in the polyhydric phenol shall be less than 1:1; if this ratio is 1:1 or greater, it can be seen that the use of any proportion of dihalide will not cause the desired resin formation to take place. Likewise, in cases (III) and (IV), the molal ratio of monohalide to dihydric phenol is 1:1, and where this ratio is 1:1 or greater, resin formation is completely blocked. Similarly, another way of expressing this limiting proportion of monohalide is that the ratio of mols of monohalide to halogen atoms in the polyhalide shall be less than 1:1; if this ratio is 1:1 or greater, no amount of dihydric phenol will produce a resin.

As a practical illustration of the above principles, the following examples are given (compare case (II) above):

*Example VIII*

| | (A) | (B) |
| --- | --- | --- |
| | *Parts* | *Parts* |
| o-Cresol | 108 (1.0 mol.) | 54 (½ mol.) |
| Di(4-hydroxyphenyl) dimethylmethane | 114 (0.5 mol.) | 171 (¾ mol.) |
| Dichlorodiethyl ether | 143 (1.0 mol.) | 143 (1 mol.) |
| Sodium hydroxide | 90 (10 parts excess) | 90 (10 parts excess) |
| Water | 250 | 250 |
| Ethyl alcohol | 180 | 180 |

In the above example, in each instance, the mixture is refluxed for 24 hours, the alcohol and water distilled off, a small amount of xylene added and the reaction completed in the presence of this solvent. For the latter step some 20–25 hours at refluxing temperature will be required. The mass is then acidified with hydrochloric acid, the amount of acid being required (after deducting for the excess alkali) showing in each case that more than 95% of the polyhalide has been used up. The acidified reaction product is diluted with toluene, filtered, and washed with water. The toluene and xylene are then removed by distillation, the last portions in shallow trays in a vacuum oven. The product of Example VIII (A) is a dark oily material which pours and flows readily at room temperature; obviously a high molecular weight polymer has not been formed through etherification. The product of Example VIII (B), although comparatively soft and balsamic, is quite definitely resinous and will neither flow nor pour at room temperature. The product of Example VIII (A) is without, and that of Example VIII (B) within, the scope of the present invention, which is concerned with polymeric materials or the formation of ether groups as a means of synthesizing resinous polymers containing a recurrence of ether linkages.

Touching next upon the various polyhalides that may be used, a large number have been found to be suitable. Bromides and iodides are in many cases even more reactive than chlorides, but are less economical. Apparently the only requisite is that the halogen atoms be sufficiently reactive to combine with the phenol, through the alkali salt of the phenol or some other common method for making ethers. It is a well known fact of chemistry that there are definite types of halogen atoms which are not readily hydrolyzed nor generally considered to be reactive, such as those attached to carbons which are joined to other carbons by means of a double bond, an illustration being the chlorine atom of vinyl chloride. Another general type of inactive halogen is that attached to an aromatic nucleus; this is related to the first since each of the aromatic carbon atoms is generally supposed to be held by one double bond. These general rules hold in the present process for the reactivity of the polyhalide with the polyhydric phenol. The dichlorobenzenes, for example, are not sufficiently reactive for combining with polyhydric phenols, nor are the chlorine atoms of di(4-hydroxy-3,5-dichlorophenyl)dimethylmethane affected in the reaction of this compound with β, β'-dichlorodiethyl ether (see Example VI). Reactive halogen atoms, as the term is used herein, are therefore those which are attached to carbon atoms which in turn are joined to other atoms by means of single bonds only. These "non-benzenoid" carbons to which the halogens of the polyhalide are attached may be primary, secondary, or tertiary in nature, i. e., they may hold two, one or no hydrogen atom, though the preference is in the order named. The atoms to which the carbon holding the halogen is joined should be singly-bonded carbon. The presence of atoms other than carbon results in less inert structures. For example, when the atom in question is oxygen (as in the case of s-dichlorodimethyl ether), an acetal-like structure would be obtained.

For reasons to be given later, probably the best type of polyhalide for making the ether resins is that containing an ether group

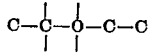

in addition to a plurality of reactive halogen atoms. Suitable polyhalides of this type are the β, β'-dichlorodiethyl ether of the preceding examples, ε, ε'-dichlorodiamyl ether, γ, γ'-dichlorodipropyl ether and the like. These are examples of halides having the elements of chemical structure noted in the skeleton formula given above. Halides of this kind may be expressed comprehensively by the more complete formula X—R—O—R'—X where X is a halogen atom, O is oxygen, and R and R' are saturated straight chain aliphatic divalent hydrocarbon radicals having a chain of at least two carbon atoms between X and O. Related directly to these are the corresponding sulfur compounds, for example β, β'-dichlorodiethylsulfide. The disulfides such as β, β'-dichlorodiethyldisulfide (i. e., having the —S—S— group) may also be used to make the ether resins, although this structure is considerably less stable.

Other useful and available types of polyhalides are the polymethylene and other alkylene dichlorides and dibromides such as ethylene dichloride, propylene dichloride, hexamethylene dibromide, isoamylene dichloride and the like. These polyhalides have the halogen atoms on different carbons, i. e., they are alkylene compounds rather than alkylidene compounds. The use of the latter would result in the formation of acetal-like structures. Halogenated petroleum hydrocarbons of this general type having two or more halogens, are suitable for making the ether resins. Suitable halides may also be obtained by addition of halogen atoms to unsaturated hydrocarbons, such as ethylene, isoprene, butadiene and the like. Rubber chloride and chlorinated fatty oils can also be employed as sources of the halogen-alkyl groups. The following example illustrates the preparation of an ether resin from a dihalogen derivative of an aliphatic hydrocarbon.

*Example IX*

| | Parts |
|---|---|
| (A) Di(4-hydroxyphenyl)dimethylmethane | 803 |
| (B) Ethylene dichloride | 349 |
| (C) Sodium hydroxide (49%) | 585 |
| (D) Water | 770 |

Ingredients (A), (C) and (D) are placed in an autoclave and heated to 50° C. with stirring. Ingredient (B) is then added, the autoclave sealed, and the temperature raised to 195° C. over a period of 3 hours and maintained at 195-225° C. for 24 hours. The resin is then acidified and washed in the usual way in a heated Werner-Pfleiderer mixer, finally being dried by heating in a vacuum oven. The final resin is soluble in aromatic hydrocarbons and insoluble in alcohol and aliphatic hydrocarbons. It is somewhat more brittle than the resin of Example III, but begins to soften at about 50° C. This autoclave method is recommended for those polyhalides of low boiling point and for those phenols whose alkali salts are difficultly soluble in water at the temperatures obtained at atmospheric pressure.

Frequently the dihalogen hydrocarbons are obtainable commercially only as mixtures. These mixtures are also suitable for making the ether resins as shown in the following example.

*Example X*

| | Parts |
|---|---|
| Di(4 - hydroxyphenyl)dimethylmethane (M. P. 157° C.) | 114 |
| Amylene dichlorides | 67 |
| Sodium hydroxide (50%) | 83 |
| Water | 200 |

The di(4-hydroxyphenyl)dimethylmethane, water and sodium hydroxide solution are heated and stirred under a reflux until a thin mixture is formed. The amylene dichlorides are then added and the mixture refluxed for 48 hours. The reflux is replaced by a downward condenser and the water distilled off, the temperature finally rising to 145° C. The viscous, pasty reaction mass is then neutralized with hydrochloric acid; the amount necessary shows about a 70% conversion of the halide. Toluene and water are added to dissolve the resin and the sodium chloride. The brine solution is separated and discarded. The toluene solution is filtered, washed with water, and a small amount of toluene distilled off to remove the residual moisture. The solid resin can be obtained by distilling off the toluene, the last traces preferably in vacuo. Films flowed from the toluene solution dry rapidly and are very hard.

As other suitable polyhalides for making ether resins, there may be mentioned polychloro derivatives of polyhydric alcohol ethers, or the halogen alkyl ethers of polyhydric alcohols, the alkyl group having more than one carbon atom in order to avoid acetal structure. As examples of these, compounds such as the β,β'-dichloroethyl ether of diethylene glycol and the γ,γ',γ''-trichloropropyl ether of glycerol may be used; the dichloromethyl ether of ethylene glycol

, having chloromethyl groups, is unsuitable. As examples of alicylic dihalides, dipentene dihydrochloride and 1,4-dichlorocyclohexane may be used to make ether resins. As an example of an aralkyl polyhalide, 1,4-dichloromethylbenzene (1,4-xylylene dichloride) may be cited.

For purposes of reactivity, it is desirable that the halide have a relatively high boiling point (e. g., in the range 150–200° C.), that the ratio of carbon atoms to halogen atoms be relatively high, and that the halogen atoms be separated by a comparatively long chain of atoms. Ethylene dichloride, boiling at 84° C., is much more difficult to react with polyhydric phenols than are the amylene dichlorides, boiling at 150–177° C. This difference in reactivity is due, not only to the difference in boiling point, but also to the fact that the amylene dichlorides have a ratio of C:Cl of 5:2, whereas in ethylene dichloride it is 1:1; this is shown by reacting the ethylene dichloride under such pressures that comparable temperatures can be obtained. Another factor which influences the reactivity of the polyhalide is the "distance" in the molecule by which the halogen atoms are separated. If both halogen atoms are attached to adjacent carbon atoms, frequently there is a marked decrease in the tendency toward resinification. The greater the distance between the halogen atoms, the greater will be the reactivity of the polyhalide. Pentamethylene dichloride, for example, is more reactive than 2,3-dichloropentane.

Still another factor of chemical structure influences the reactivity of the polyhalide. The presence of at least one ether group in the chain of carbon atoms causes the halogen atoms to combine more readily with the phenol. For example, $\beta,\beta'$-dichlorodiethyl ether is more reactive in this way than is tetramethylene dichloride. With the exception already noted, (i. e., acetal-like structures) the typical inertness of the ether resins is not affected by the presence of another ether group in one of the ingredients. For these reasons, ether polyhalides are especially desirable.

The desirable (although not necessary) features of the polyhalide selected for making the ether resin can then be summed up as follows:

(1) A boiling point of at least 100° C., preferably above 150° C.

(2) The ratio of carbon atoms to halogen atoms should be relatively high, e. g., at least 3:2 and preferably 2:1 or higher.

(3) The halogen atoms should be as widely separated in the molecule as possible. There should be, for example, a chain of at least three or four intermediate atoms.

(4) One or more intermediate ether groups enhances the reactivity of the polyhalide.

(5) The carbons holding the halogen atoms should be joined to carbon or hydrogen.

It should be understood, of course, that polyhalides which do not fulfill one or more of the above conditions are still suitable for making the ether resins, but not nearly so desirable. In the final analysis, the only definite requirement is that the halogen atoms be sufficiently reactive to unite with the polyhydric phenol, through the alkali salt of the phenol, or by some other method for making ethers. As previously explained, halogen atoms having this reactivity are those which are attached to carbon atoms which are in turn joined to other atoms by means of single bonds only. Compounds having halogen atoms attached to carbonyl or sulfonyl groups are outside the scope of this invention. From the theoretical point of view, it is obvious that a resin which might be obtained by combining a polyacid chloride with a polyhydric phenol would be built up of ester-type linkages rather than ether linkages, and would be more sensitive to chemical and physical influences. In actual practice, resins can be obtained from polyacid chlorides, for example, and polyhydric phenols. While these resins are new and useful for certain purposes, they are very brittle and do not approach the ether resins in toughness. Likewise, they do not approach the ether resins in resistance to chemical and physical action, being sensitive to the action of water and alkali and such physical influences as light.

While the above discussion of polyhalides has been confined mostly to dihalides, it is possible to make ether resins from higher polyhalides. As examples of such polyhalides, there may be mentioned 1,4,7-trichloroheptane and other polychloraliphatic hydrocarbons (such as mixtures of highly chlorinated petroleum hydrocarbons), and 1,3,5-chloromethylbenzene or 1,3,5-mesitylene trichloride. In the same way that the ether resin formation from trihydric and higher polyhydric phenols is "blocked" with monohydric phenols to prevent formation of insoluble products, a similar effect can be obtained by employing a monohalide in conjunction with a trihalide or higher halide. Suitable monohalides are benzyl chloride, octadecyl chloride, 9,10-octadecenyl chloride, amyl bromide, and mixtures of chlorinated aliphatic hydrocarbons containing only one halogen atom. The proportion of monohalide should be limited as previously described however.

There is another variation in the types of polyhydric phenols and polyhalides from which ether resins can be made. Such phenols and halides are those which contain, in addition to the halogen atoms and the phenolic hydroxyls, other atoms or groups which are ordinarily considered to be much more reactive than the ether, sulfide, sulfone, ketone, alkoxy, aryloxy, nuclear halogen, etc., groups which have already been disclosed as being present in some of the most useful types of polyhydric phenols or poly halides. Such additional groups are —NO₂, —NH—, —NH₂, —COOH, CONH₂, CONHR, —COOR, RCOO—, aliphatic OH or SH, SO₂H, SO₂NHR and the like. Examples of these are trichlorotriethylamine, dichlorodiethylamine, gallic acid, dihydroxyphthalic acid, dihydroxynaphthalene-sulfonamide, etc. These afford the advantage of possible further reaction, e. g., dihydroxyphthalic acid ether resins may be further reacted with polyhydric alcohols, e. g., glycerol or with polyhydric alcohol derivatives such as mono or di-linseed oil glyceride. Ether resins containing sulfonamide groups may likewise be further reacted, for example, with aldehydes. Conditions for the preparation of ether resins from phenols or halides containing such groups are naturally more complicated and vary with the group; nevertheless the formation of an ether resin will take place just as readily, provided these additional groups do not interfere with the ether resin-forming reaction. The presence of such groups in the ether resin, however, tends to have a deleterious effect on the most desirable characteristic of the new ether resins, viz., their great inertness, and for this reason the presence of these groups is generally to be avoided. There is one case where some of this inertness may be sacrificed to advantage, viz., where the polyhalide contains an aliphatic alcohol group or groups. Such groups permit modifications of the resin by esterification with mono- and poly-carboxylic acids, either during or after resinification; a polyhalide of this type is glycerol $\alpha,\alpha'$-dichlorhydrin. On the other hand, polyhydric phenols having methylol groups are unsuitable except in rare cases where such phenols have no tendency to polymerize to infusible masses before reaction can take place with the polyhalide. If it is desired to introduce the aliphatic alcohol group or groups through the polyhydric phenol, the alcoholic OH group may be separated from the aromatic nucleus by a chain of at least two carbon atoms; a suitable compound of this nature therefore is 2,4-dihydroxyphenylethyl alcohol: $(OH)_2—C_6H_3—CH_2CH_2OH$. Monocarboxylic acids such as benzoic, stearic, oleic, butyric, linoleic, fatty acid mixtures (linseed oil acids, China-wood oil acids, cottonseed oil acids and the like), etc., can be used for this subsequent esterification. The ether resins modified with fatty acids in this manner are much more soluble in fatty oils, particularly drying oils, than the unmodified ether resins, or can be more readily blended therewith by heating. As would be expected, however, the carboxylic acid modified ether resins are not so inert to water, alkali, and the like as the unmodified resins, this being due to the presence of ester groups in the former.

In line with the presence of other groups in the ether resins, it may be mentioned that sulfonation of the preformed ether resins gives products which are valuable wetting, flotation, and tanning agents. The ether resins can also be acetylated (as with ketene) or nitrated.

There is another way in which these ether resins can be made, though at considerably greater difficulty, that is, by intermolecular reaction of an organic compound containing a phenolic hydroxyl and a reactive (as above described) halogen. An example of such a compound is $HO—C_6H_4—C(CH_3)_2—C_6H_4—$
$O—CH_2—CH_2—O—CH_2—CH_2—Cl$ which is an intermediate product not ordinarily isolated in the reaction of di(4-hydroxyphenyl)-dimethylmethane with $\beta,\beta'$-dichlorodiethyl ether. The difficulty of obtaining such compounds in any state approaching purity together with the difficulties of the reaction cause this process to be very definitely not preferred. Another compound of this nature is $HO—C_6H_4—C(CH_3)_2—C_6H_4—OCH_2—CH_2Cl$ More comprehensively the new ether resins can be defined as resins formed by the interaction of one or more organic compounds having at least two reactive halogen atoms with one or more organic compounds having at least two phenolic hydroxyl groups, with or without one or more organic compounds having one aliphatic halogen and/or organic compounds having one phenolic hydroxyl. Of the polyhydric phenols and polyhalides, there are certain types which give best results, either from the standpoint of the nature of the resins or the ease with which the resinification is carried out; these selections are made according to the principles pointed out hereinbefore.

The new ether resins may also be defined structurally as having a recurrence of the grouping —X—O—Y—O— where X is a bivalent organic radical whose atoms adjacent to oxygen are aromatic carbons, O is oxygen, and Y is a bivalent organic radical free of ester groups whose atoms adjacent to oxygen are carbon atoms which are joined to other atoms by single bonds only. X may be a hydrocarbon aryl group or it may have other substituents or components, e. g., it may be $—C_6H_4—SO_2—C_6H_4—$, $—C_6H_4—CO—C_6H_4—$,
$—C_6H_4—C_6H_4—$, $—C_6H_3Cl—C(CH_3)_2—C_6H_3Cl—$,
$—C_6H_4—C(CH_3)_2—C_6H_4—$, etc. Y may be an alkylene hydrocarbon group or it may have other components, e. g., it may be $—C_2H_4—O—C_2H_4—$, $—C_3H_6—S—C_3H_6—$,
$—C_4H_8—Se—C_4H_8—$, $—C_2H_4—CO—C_2H_4—$,
$—CH_2—C_6H_4—CH_2—$, etc. The resins obtained from phenols of more than two phenolic hydroxyl groups may be formulated

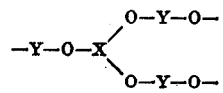

or

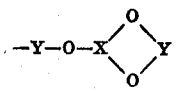

X being trivalent in this case instead of bivalent. These do not contain the recurring structural units substantially all in one linear chain. The preferred resins obtained from dihydric phenols and dihalides may be formulated thus:

$—Y—O—X—O—Y—O—X—O—Y—O—X—O—$ and apparently contain substantially all of the structural units in linear chains.

As will be seen from the foregoing description, the resins of the present invention are made up of ether linkages and possess the chemical inertness characteristic of ether structure. These resins are substantially free from ester groups inasmuch as the polyhalides used in the present invention do not contain such groups. The presence of ester groups, as previously pointed out, imparts lessened inertness to water and alkali.

It has been stated that the ether resins are extremely resistant to chemical action including that of strong acids and alkalis. However, on very drastic treatment with strong hydrobromic or hydriodic acids, such as long-continued boiling, the aromatic ether linkages can be split, although with difficulty, and a mixture of products comprising a polyhydric phenol and an aliphatic halide will be obtained.

The new ether resins are suited for a wide variety of uses. As coating compositions, they may be used alone and in certain cases blended by heating, by mutual solvents, or by other means, with one or more of the following: (1) cellulose derivatives, such as nitrocellulose, cellulose acetate, cellulose propionate, cellulose acetobutyrate, ethyl cellulose, and benzyl cellulose; (2) natural resins, such as rosin, kauri, and damar; (3) natural resin derivatives, such as ethyl abietate, ester gum, Congo glycolide, and hydrogenated rosin; (4) drying oils such as linseed, China-wood, etc.; (5) other synethetic resins, such as polyhydric alcohol-polybasic acid, amine-aldehyde, phenol-aldehyde, and vinyl; (6) bitumens, such as asphalts. To the ether resins, either alone or combined with the above substances, I may add pigments, fillers, lakes, plasticizers, solvents, etc., as needed and desired, in accordance with methods known to the art. I may employ any of the known methods of applying the finish, such as spraying, brushing, baking, air-drying, etc. With reference to the above combinations, however, it may be pointed out that compatibilities with most fatty oils, synthetic resins, and cellulose derivatives are limited. It may be also mentioned that benzyl cellulose is the best of the cellulose derivatives from the standpoint of compatibility. However, it is not generally necessary to resort to any of the above combinations in making the coating compositions, since the ether resins possess in themselves almost ideal characteristics for this use. Films of the ether resins alone, for example, when flowed from a pigmented or unpigmented solution in organic solvents, are extremely durable and protect metal surfaces in a remarkable way from corrosion and eliminate other effects produced on ordinary paint and varnish films by atmospheric influences. The ether resins may also be used as undercoats, primers and surfacers for general use. The topcoats, for example, may be: cellulose derivatives, such as nitrocellulose and cellulose acetate; synthetic drying oils comprising polymerizable polymers of acetylene derivatives, such as divinylacetylene polymer; phenol-formaldehyde resins, urea-formaldehyde resins, oil-modified polyhydric alcohol-polybasic acid resins, and synthetic resins generally, or mixtures thereof; metal protective paints of all kinds; etc. Conversely, the ether resins are highly advantageous as protective topcoats for other less durable coating compositions, such as the above enumerated substances.

Other valuable uses for the ether resins are as follows: molding plastics, either with or without fillers; binding agents for mica in the manufacture of insulating materials; the sandwiching material or adhesive therefor in making shatter-proof glass; binding agents for sheets of cellulose acetate, paper, and the like in the manufacture of laminated sheet and tube products; adhesives and thermoplastic cements and sealing waxes for general use; impregnating, coating, sizing, glazing, or water-proofing agents for linoleum, rubber, regenerated cellulose, cellulose ethers and esters, fabrics, paper, porous stone, leather, artificial leather, rubber-coated fabrics (which may also have a coat of oil varnish), wood, wood pulp, etc.; binders for linoleum plastics; formulation of printing inks; and the manufacture of artificial fibers. Many of the combinations mentioned in the preceding paragraph on coating compositions (i. e. with oils, waxes, resins, cellulose derivatives, etc.) can be used for the above purposes.

Being transparent and highly resistant to shock, the ether resins, especially those of lighter color, can be employed as glass substitutes, as photographic films or plates, and as motion picture film. The ether resins from the highly chlorinated polyhydric phenols are valuable fire-retardants.

There is another important use which is remarkable for a synthetic resinous material and which unquestionably distinguishes the ether resins from phenol-aldehyde resins. In the form of thin sheets, the ether resins, and some of them to a very high degree, are so tough, flexible, and tear-resistant that they can be used very advantageously as decorative and protective wrappings and as substitutes in general for the commercial regenerated cellulose such as that marketed under the trade name "Cellophane". These sheets are transparent, non-toxic, almost totally impervious to moisture, and possess in addition many properties and advantages not present in ordinary or moisture-proof regenerated cellulose. Sheets of the ether resins for example are non-deforming under the influence of water or water-vapor; they are water-proof as well as moisture-proof; they do not require adhesives or other agents for sealing, this being accomplished merely by application of heat; they are much less inflammable than regenerated cellulose; they are odorless and tasteless.

There are a large number of more specific uses which will suggest themselves to those familiar with the resin art. A number of these can be mentioned to illustrate the extremely wide field of application of the new ether resins. The new products are suitable for example as: impregnating agents for milk-bottle caps (with or without waxes); boot and shoe stiffeners and water-proofing agents for sole leather; adhesive, preservative, and transparency-producing agents for parchment paper; impregnating agents for highly absorptive papers, e. g., "Krafelt"; impregnating agents for thin paper for use as substantially transparent or translucent film or wrapping material as for example a substitute for glassine paper; impregnating and coating agents for wall paper, with or without waxes and other materials; impregnating agents for tire cord to permit the use of short fibers; impregnating and water-proofing agents for cotton which is to be used in making canvas, tenting material, and the like; impregnating and toughening agents for hemp ropes, linen, duck, flannel, woolen fibers, etc.; coating and impregnating agents for airplane fabric and balloon cloth; binders for artificial fiber board such as "Agasote" and "Pantasote"; varnishes for electric cables and wires; flexible finishes for tin or galvanized containers or for any metallic article which is stamped into shape; flexible binders for sandpaper and emery cloth; impregnating or coating agents for currency paper; impregnating agents for rayon and rayon fiber with the objects of strengthening, water-proofing and de-lustering; impregnating agents for paper containers for milk, oil, or other liquid materials; clear varnishes for golf balls and tennis racquets or other stringed articles where great toughness and flexibility is desired; impregnating agents for fibers used in the manufacture of steam hose, garden hose, etc.

A very novel use for the ether resins is for cementing architectural slabs, sheets or blocks of glass. Another novel use for the very soft and plastic ether resins is as a chicle substitute in making chewing gum.

From the foregoing description, it is apparent that new synthetic resins having many and varied uses in the arts have been described. The new resins are almost an ideal type, especially from the standpoint of coating compositions. To obtain hard films, it is not necessary to resort to heat treatment or oxidation; the new resins resemble the cellulose derivatives in their ability to dry very rapidly and simply by evaporation of solvent. They are unlike the cellulose derivatives in that they are very tough and adherent to practically any type of surface, are resistant to discoloration, and are remarkably inert to physical and chemical influences such as heat, light, water, acid, alkali and the commoner solvents, such as gasoline, and aliphatic alcohols and esters. Likewise, the remarkable inertness is due to the fact that the resins are built up of ether linkages, a type of chemical bond which is well known for its stability under drastic chemical and physical treatments.

As many apparently widely different embodiments of this invention may be made without departing from the spirit and scope thereof, it is to be understood that I do not limit myself to the specific embodiments thereof except as defined in the appended claims, and as restricted by my definitions of the terms "polyhydric phenol", "reactive polyhalide", and "polymerizing proportions".

I claim:

1. The process of synthesizing non-heat-hardening ether resins which comprises reacting in resinifying proportions a substantially unpolymerizable monomeric polyhydric phenol and an organic polyhalide free of ester groups whose halogen atoms are all attached to different carbon atoms which are in turn joined to other atoms by single bonds only.

2. A non-heat-hardening resin consisting essentially of ether linkages, said resin comprising the reaction product of a substantially unpolymerizable monomeric polyhydric phenol and an organic polyhalide free of ester groups whose halogen atoms are all attached to different carbon atoms which are in turn joined to other atoms by single bonds only.

3. The process of synthesizing non-heat-hardening ether resins which comprises reacting in resinifying proportions a substantially unpolymerizable monomeric polyhydric phenol and an organic polychloride free of ester groups whose chlorine atoms are all attached to different carbon atoms which are in turn joined to other atoms by single bonds only.

4. A non-heat-hardening resin consisting essentially of ether linkages, said resin comprising the reaction product of a substantially unpolymerizable monomeric polyhydric phenol and an organic polychloride free of ester groups whose chlorine atoms are all attached to different carbon atoms which are in turn joined to other atoms by single bonds only.

5. The process of synthesizing non-heat-hardening ether resins which comprises reacting in resinifying proportions in an alkaline medium a substantially unpolymerizable monomeric polyhydric phenol and an organic polyhalide free of ester groups whose halogen atoms are all attached to different carbon atoms which are in turn joined to other atoms by single bonds only.

6. A non-heat-hardening resin consisting essentially of ether linkages, said resin comprising the alkaline reaction product of a substantially unpolymerizable monomeric polyhydric phenol and an organic polyhalide free of ester groups whose halogen atoms are all attached to different carbon atoms which are in turn joined to other atoms by single bonds only.

7. The process of synthesizing non-heat-hardening ether resins which comprises reacting in resinifying proportions a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 3:2.

8. A non-heat-hardening resin consisting essentially of ether linkages, said resin comprising the reaction product of a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 3:2.

9. The process of synthesizing non-heat-hardening ether resins which comprises reacting in resinifying proportions in an alkaline medium a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 3:2.

10. A non-heat-hardening resin consisting essentially of ether linkages, said resin comprising the alkaline reaction product of a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 3:2.

11. The process of synthesizing non-heat-hardening ether resins which comprises reacting in resinifying proportions in an alkaline medium a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 2:1.

12. A non-heat-hardening resin consisting essentially of ether linkages, said resin comprising the alkaline reaction product of a substantially unpolymerizable monomeric polyhydric phenol and an organic polyhalide free of ester groups whose halogen atoms are all attached to different carbon atoms which are in turn joined to other atoms by single bonds only, the ratio of carbon atoms to halogen atoms being at least 2:1.

13. The process of synthesizing non-heat-hardening ether resins which comprises reacting in resinifying proportions in an alkaline medium a substantially unpolymerizable monomeric dihydric phenol and an organic polyhalide free of ester groups whose halogen atoms are all attached to different carbon atoms which are in turn joined to other atoms by single bonds only, the ratio of carbon atoms to halogen atoms being at least 2:1.

14. A soluble, permanently fusible, non-heat-hardening resin consisting essentially of ether linkages, said resin comprising the alkaline reaction product of a substantially unpolymerizable monomeric dihydric phenol and an organic dihalide free of ester groups whose halogen atoms are all attached to different carbon atoms which are in turn joined to other atoms by single bonds only, the ratio of carbon atoms to halogen atoms being at least 2:1.

15. The process of synthesizing non-heat-hardening ether resins which comprises reacting in resinifying proportions in an alkaline medium a substantially unpolymerizable monomeric dihydric phenol and an organic polychloride free of ester groups whose chlorine atoms are all attached to different carbon atoms which are in turn joined to other atoms by single bonds only, the ratio of carbon atoms to chlorine atoms being at least 2:1.

16. A soluble, permanently fusible, non-heat-hardening resin consisting essentially of ether linkages, said resin comprising the alkaline reaction product of a substantially unpolymerizable monomeric dihydric phenol and an organic dichloride free of ester groups whose chlorine atoms are all attached to different carbon atoms which are in turn joined to other atoms by single bonds only, the ratio of carbon atoms to chlorine atoms being at least 2:1.

17. The process of synthesizing ether resins which comprises reacting in resinifying proportions in an alkaline medium a substantially unpolymerizable monomeric polyhydric phenol and an organic polyhalide free of ester groups whose halogen atoms are separated by a chain of at least five other atoms, said halogen atoms all being attached to different carbon atoms which are in turn joined to other atoms by single bonds only.

18. A resin consisting essentially of ether linkages, said resin comprising the alkaline reaction product of a substantially unpolymerizable monomeric polyhydric phenol and an organic dihalide free of ester groups whose halogen atoms are separated by a chain of at least five other atoms, said halogen atoms all being attached to different carbon atoms which are in turn joined to other atoms by single bonds only.

19. The process of synthesizing ether resins which comprises reacting in resinifying proportions in an alkaline medium a substantially unpolymerizable monomeric polyhydric phenol and an organic polyhalide having at least one ether group, the halogen atoms of said polyhalide being all attached to different carbon atoms which are in turn joined to other atoms by single bonds only.

20. An ether resin comprising the alkaline reaction product of a substantially unpolymerizable monomeric polyhydric phenol and an organic polyhalide having at least one ether group, the halogen atoms of said polyhalide being all attached to different carbon atoms which are in turn joined to other atoms by single bonds only.

21. A process of synthesizing a resin which comprises reacting in resinifying proportions in an alkaline medium a substantially unpolymerizable monomeric polyhydric phenol and an organic polyhalide of the formula X—R—O—R'—X where X is a halogen atom, O is oxygen and R and R' are saturated divalent straight chain aliphatic hydrocarbon radicals having a chain of at least two carbon atoms between X and O.

22. A synthetic resin comprising the alkaline reaction product of a substantially unpolymerizable monomeric polyhydric phenol and an organic polyhalide of the formula X—R—O—R'—X where X is a halogen atom, O is oxygen and R and R' are saturated divalent straight chain aliphatic hydrocarbon radicals having a chain of at least two carbon atoms between X and O.

23. The process of synthesizing ether resins which comprises reacting in resinifying proportions in an alkaline medium a substantially unpolymerizable monomeric dihydric polynuclear phenol and an organic polyhalide whose halogen atoms are all attached to different carbon atoms, said carbon atoms being joined in turn to other atoms by single bonds only.

24. The process of synthesizing ether resins which comprises reacting in resinifying proportions in an alkaline medium a substantially unpolymerizable monomeric dihydric polynuclear phenol of the general formula

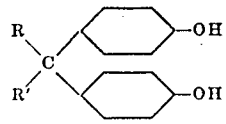

(R being hydrogen, alkyl or aryl, and R' being alkyl or aryl), and an organic polyhalide whose halogen atoms are all attached to different aliphatic carbon atoms, said carbon atoms being joined in turn to other atoms by single bonds only.

25. An ether resin comprising the alkaline reaction product of a substantially unpolymerizable monomeric dihydric polynuclear phenol of the general formula

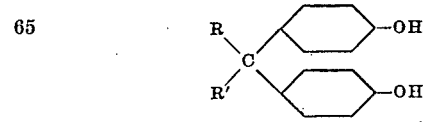

(R being hydrogen, alkyl or aryl, and R' being alkyl or aryl), and an organic polyhalide whose halogen atoms are all attached to different carbon atoms, said carbon atoms being joined to other atoms by single bonds only.

26. The process of synthesizing ether resins which comprises reacting in resinifying proportions in an alkaline medium a substantially unpolymerizable monomeric dihydric polynuclear phenol of the general formula shown in claim 24, in which the phenol has ring constituents selected from the class consisting of halogen, alkyl and aryl, and an organic dihalide whose halogen atoms are attached to different carbon atoms, said carbon atoms being joined to other atoms by single bonds only.

27. An ether resin comprising the alkaline reaction product of a substantially unpolymerizable monomeric dihydric polynuclear phenol of the general formula shown in claim 25, in which the phenol has ring constituents chosen from the class consisting of halogen, alkyl and aryl, and an organic dihalide whose halogen atoms are all attached to different carbon atoms, said carbon atoms being joined to other atoms by single bonds only.

28. The process of synthesizing resins which comprises reacting in resinifying proportions in an alkaline medium di-(4-hydroxyphenyl)dimethylmethane and $\beta,\beta'$-dichlorodiethyl ether.

29. A resin obtained by the alkaline reaction of di-(4-hydroxyphenyl) dimethylmethane with $\beta,\beta'$-dichlorodiethyl ether.

30. The process of synthesizing resins which comprises reacting in resinifying proportions in an alkaline medium resorcinol and $\beta,\beta'$-dichlorodiethyl ether.

31. A resin obtained by the alkaline reaction of resorcinol with $\beta,\beta'$-dichlorodiethyl ether.

32. The process for making an ether resin which comprises reacting in resinifying proportions phenolphthalein and an organic polyhalide whose halogen atoms are all attached to different carbon atoms which are in turn joined to other atoms by single bonds only.

33. The resinous reaction product of phenolphthalein and an organic polyhalide whose halogen atoms are all attached to different carbon atoms which are in turn joined to other atoms by single bonds only.

34. A non-heat-hardening synthetic resin giving on hydrolysis with hot hydrobromic acid a mixture of products comprising a phenolic body and at least one organic compound having at least two bromine atoms all of which are attached to different carbon atoms which are in turn joined to other atoms by single bonds only.

35. A shaped article comprising essentially the resin of claim 1.

36. A molded article comprising essentially the resin of claim 1.

37. A self-supporting film comprising essentially the resin of claim 1.

38. The process of synthesizing ether resins which comprises reacting in resinifying proportions in an alkaline medium a substantially unpolymerizable monomeric polyhydric phenol and an organic polyhalide free of ester groups and having at least two halogen atoms all of which are attached to different carbon atoms which are in turn joined to other atoms by single bonds only, the ratio of carbon atoms to halogen atoms being at least 3:2, kneading the crude hot resin in a heated mixer while washing first with mineral acid until the washings are acid to Congo red, and second with water until the washings give substantially no turbidity with silver ions, and continuing the kneading until the resin is substantially dry.

JAMES A. ARVIN.